United States Patent [19] [11] 4,357,448
Tsubaki et al. [45] Nov. 2, 1982

[54] TWO STEP PROCESS FOR POLYMERIZING ETHYLENE

[75] Inventors: Kazumi Tsubaki; Hiroshi Morinaga; Yoshiho Matsuo; Takeshi Iwabuchi, all of Ichihara, Japan

[73] Assignee: Nissan Chemical Industries Ltd., Tokyo, Japan

[21] Appl. No.: 151,637

[22] Filed: May 20, 1980

Related U.S. Application Data

[63] Continuation of Ser. No. 33,512, Apr. 26, 1979, abandoned.

[30] Foreign Application Priority Data

May 10, 1978 [JP] Japan .................................. 53-55323

[51] Int. Cl.³ .............................................. C08F 4/66
[52] U.S. Cl. .................................. 526/65; 252/429 B; 526/66; 526/79; 526/339; 526/348; 526/348.4; 526/348.5; 526/348.6
[58] Field of Search ...................... 526/128, 65, 66, 79

[56] References Cited

FOREIGN PATENT DOCUMENTS 2504036 8/1975 Fed. Rep. of Germany .
2621591 11/1976 Fed. Rep. of Germany .
48-154 4/1973 Japan .
50-19308 7/1975 Japan .
50-19309 7/1975 Japan .
51-47079 4/1976 Japan .
52-13232 4/1977 Japan .
1057728 2/1967 United Kingdom .

*Primary Examiner*—Stanford M. Levin

*Attorney, Agent, or Firm*—Oblon, Fisher, Spivak, McClelland & Maier

[57] ABSTRACT

Ethylene or a mixture of ethylene and a small amount of another α-olefin or diene is polymerized in two successive steps under different hydrogen partial pressures by polymerizing 30 to 70 wt. % of the ethylene or ethylene mixture to be polymerized in the presence of hydrogen at a molar ratio of ethylene or ethylene mixture to hydrogen of 1:1–8 in the first step and polymerizing the residual ethylene or the ethylene mixture at a molar ratio of ethylene to hydrogen of 1:0–0.3 in the second step, in the presence of the specific catalyst system comprising an organoaluminum compound (C) and a specific solid catalytic component (B) obtained by reacting a titanium or vanadium halogen-containing compound with a reaction product (A) obtained by reacting a Grignard reagent with a hydropoly-siloxane having the formula

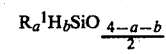

($R^1$ represents an alkyl, aryl, aralkyl, alkoxy, or aryloxy group as a monovalent organic group; a is 0,1 or 2; b is 1, 2 or 3; and $a+b \leq 3$)

or a silicon compound containing an organic group and hydroxyl group in the presence or absence of an aluminum-alkoxide, aluminum alkoxy-halide halide or a reaction product obtained by reacting the aluminum compound with water.

8 Claims, No Drawings

TWO STEP PROCESS FOR POLYMERIZING ETHYLENE

This is a continuation of application Ser. No. 033,512 filed Apr. 26, 1979, abandoned.

BACKGROUND OF THE INVENTION

1. Field of the Invention

The present invention relates to an improved process for polymerizing ethylene or a mixture of ethylene and a small amount of another α-olefin (hereinafter referred to as simply ethylene) in two successive steps by using a catalyst having high catalytic activity.

More particularly, it relates to a process for producing polyethylene having excellent characteristics for an extrusion molding technique such as hollow molding, in high productivity while controlling the average melecular weight and molecular weight distribution of the product.

2. Description of the Prior Arts

Recently, it has been proposed to prepare a catalyst system for a polymerization of ethylene which has high catalytic activity by combining an organometallic compound with a solid catalytic component obtained by reacting a transition metal halide with various carriers in order to increase the efficiency of the Ziegler type catalyst systems which comprise a transition metal halide and an organometallic compound to gain economic advantages for the polymerization of ethylene.

The inventors have proposed catalyst systems having high catalytic activity which comprises a catalytic component of a reaction product obtained by reacting a specific organic silicon compound with an organic magnesium compound in Japanese Patent Publications Nos. 19308/1975, 19309/1975, 154/1976 and 13232/1977.

In these prior inventions for polymerizing ethylene by using the catalyst systems, catalytic activities for the transition metal component or the solid catalytic component are remarkably high whereby a step of a catalyst-decomposition and separation can be eliminated and the solvent purifying step can be simplified all of which substantially contribute to a reduction in production costs.

However, the molecular weight distribution of polyethylene produced by using such catalyst system is too narrow, so that the product polyethylene is preferably used in special applications such as in injection molding and rotary molding. The polyethylene is not suitable for use in such areas as extrusion molding and hollow molding.

Usually, when a polyethylene having a narrow molecular weight distribution is molded by an extrusion molding or a hollow molding process a, high extrusion velocity can not be expected in the molding operation which results in low productivity and a product of rough texture whose surface is like shark skin or contains, streaks and pits and whose surface is of uneven thickness. These are serious disadvantages in practical applications.

The phenomenon of a rough surface texture of molded products highly related to the molecular weight distribution of the polyethylene. The rough texture of the molded product improves as the molecular weight distribution of the polymer is broadened.

The flow ratio (FR) is used as the practical rating for showing the molecular weight distribution degree of a polymer product. The flow ratio (FR) is shown as $FR=MI_{10}/MI_2$ wherein $MI_2$ and $MI_{10}$ respectively represent melt indexes at 190° C. under a load of 2.16 kg and 10.0 kg in the method of ASTM-D 1238-57T. Among polymers having a similar $MI_2$ value, a polymer having a higher FR has broader molecular weight distribution.

The molecular weight distribution of a polymer can be slightly broadened according to the kind of organometallic compound used as a cocatalyst or by varing the concentration of a molecular weight regulator in the polymerization process in the cases where a catalyst systems is employed. However, it has not been satisfactory in a practical process.

The inventors have studied to improve a molecular weight distribution of a polymer which is the disadvantage of the prior arts. The present invention has been attained by these studies.

SUMMARY OF THE INVENTION

It is an object of the present invention to provide polyethylene having a broad molecular weight distribution which has excellent moldability characteristics for extrusion molding processes or a hollow molding process and can be used in various fields.

It is another object of the present invention to provide a process for polymerizing ethylene to produce polyethylene of high quality in high yield without a step of removing the catalyst residue after polymerization by using a highly reactive catalyst system.

The foregoing and other objects of the present invention have been attained by providing a process for polymerizing ethylene with or without a small amount of another α-olefin or diene, in two successive steps each step employing different hydrogen partial pressures by polymerizing 30 to 70 wt.% of ethylene or an ethylene mixture to be polymerized in the presence of hydrogen at a molar ratio of ethylene to hydrogen of 1:1–8 in the first step and polymerizing the residual ethylene or ethylene mixture at a molar ratio of ethylene or ethylene mixture to hydrogen of 1:0–0.3 in the gaseous phase in the second step in the presence of the specific catalyst system comprising an organoaluminum compound (C) and a specific solid catalytic component (B) obtained by reacting a titanium or vanadium halogen-containing compound with a reaction product (A) obtained by reacting a Grignard reagent with a hydropolysiloxane having the formula

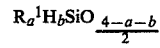

($R^1$ represents an alkyl, aryl, aralkyl, alkoxy, or aryloxy group as a monovalent organic group; a is 0,1 or 2; b is 1,2 or 3; and $a+b \leq 3$) or a silicon compound bonding an organic group and hydroxyl group in the presence or absence of an aluminum-alkoxide, aluminum alkoxyhalide or a reaction product obtained by reacting the aluminum compound with water.

DETAILED DESCRIPTION OF THE PREFERRED EMBODIMENTS

Two or more step polymerization methods in which the catalyst system is not changed have been known as a means for controlling the molecular weight distribution of polymers as desired as shown in British Pat. No. 1,057,728, Japanese patent Publication Nos. 9089/1964, 11349/1971 and 42716/1973; and Japanese Unexamined patent Publication No. 5941/1972 and 47079/1976. In the latter two publications, carrier type catalysts are used as the catalyst system to improve the yields of the polymers. However, in Japanese Unexamined patent Publication No. 47079/1976, a solution polymerization should be carried out at relatively high temperature under relatively high pressure. The heat of the polymerization can be effectively utilized, but a cost of the apparatus is disadvantageously high, moreover, in the solution polymerization, it is difficult to stir in high concentration of the polymer whereby a control of the polymerization is difficult. Therefore, the concentration of the polymer should be remarkably lower than that of the slurry polymerization.

The productivity per unit capacity of the reactor is disdavantageously low. In Japanese Unexamined patent Publication No. 5941/1972, a yield of the polymer is only about 1 to 2 kg of polyethylene per 1 mmole of Ti. This is remarkably low yield in comparison with that of the present invention.

In Japanese patent Publication No. 42716/1973, special aluminum compounds and vanadium compounds as the transition metal compound are used as the catalytic components and the activity of the resultant catalyst is relatively high. However, according to experiments, the life of the catalyst is short and the reproducibility is not satisfactory. Moreover, the resulting polymers are obtained in a very finely powdered form thus rendering filtration and drying of the polymer not easy. This process is not suitable as a practical process.

The inventors have found the polymerization process at relatively low temperature under relatively low pressure by using a specific catalyst having special characteristics especially high catalytic activity which results easy reaction control.

The characteristics of the catalyst system used in the present invention are as follows.

(1) The catalytic activity is remarkably high whereby high productivity of the polymer can be maintained even though a high content of a molecular weight regulator is used.

(2) The catalyst system is sensitive to a molecular weight regulator such as hydrogen, whereby the molecular weight of the polymer can be widely varied from high molecular weight to low molecular weight.

(3) The formation of a wax is small.

(4) The bulk density of the polymer powder is high and particle sizes are uniform. These advantageous characteristics suitable for two step polymerization process are given.

The preferable embodiment of the present invention will be briefly illustrated.

The polymerization of ethylene is successivly carried out in two polymerization zones which are in substantially stationary states.

Polyethylene produced in the first polymerization zone is fed into the second polymerization zone together with the catalyst, a solvent, unreacted ethylene, etc. Ethylene, and if necessary, a small amount of another α-olefin or diene is newly added to carry out the polymerization in the second polymerization zone and the desired polymer is obtained from the second polymerization zone.

The resulting polyethylene has excellent fabricability during molding and has excellent appearance without the appearance of a shark skin-like look, fish-eye, or other rough texture feature. Such effects can not be obtained by mechanically or physically mixing polymers having remarkably different molecular weights.

This reason is not clearly understood. Thus, it is considered that the polymer having different chain length is successively formed on the surface of the catalyst particles in the growth of the polymer particles. As a result, the uniformity of blending of the polymer chains is remarkably superior to that of the mechanical mixing of two kinds of polymer powder. This causes superior fabricability during molding and superior physical properties.

The polymerization of the present invention is carried out as the conventional process for polymerizing ethylene in the presence of a Ziegler type catalyst in each step.

For example, the catalyst system is dispersed in an inert hydrocarbon medium such as hexane, heptane, and kerosene, and then ethylene (other α-olefin) or diene is fed to start the polymerization.

The polymerization in the first step is carried out at 50° to 110° C. preferably 60° to 90° C. under conditions in which a slurry of the resulting precipitated polymer is formed. The polymerization pressure is relatively low and usually in a range of 1 to 50 kg/cm$^2$ preferably 1 to 20 kg/cm$^2$.

The control of molecular weight can be achieved at certain levels by varying the polymerization temperature. However, hydrogen is practically used as a molecular weight regulator. The content of hydrogen in the polymerization system is usually 1 to 8 mole per 1 mole of ethylene (α-olefin) in the gaseous phase.

The melt index $MI_2$(which corresponds to molecular weight of the polymer to give smaller value for larger molecular weight) of the resulting polymer is usually in a range of 1 to 5,000 g/10 min. In the first step, 30 to 70 wt% of ethylene (α-olefin) to the finally resulting polyethylene is polymerized.

The polymerization is the second step is carried out at substantially the same temperature and at substantially the same pressure as employed in the first step. However, the content of hydrogen is usually in a range of 0 to 0.3 mole per 1 mole of ethylene (α-olefin) in the gaseous phase. In the second step, the polymer having $MI_2$ of 0.0001 to 0.2 g/10 min is formed.

The ratio of the polymer produced in the first step to the polymer produced in the second step is especially important since the average molecular weight and molecular weight distribution of the finally resulting polymers depend upon the molecular weights and the ratio of the polymers formed in the first and second steps.

The ratio of the polymer formed in the first step to the polymer formed in the second step are determined so as to give suitable physical characteristics, especially average molecular weight and molecular weight distribution and density of the finally resulting polymers. The ratio can be determined by selecting the polymerization pressures and the residence times in the first and second steps.

The conditions of the polymerization in the practical operation can be easily determined from data measured on the conditions of the operations for the reactors in the particular plant.

The polymerization of ethylene means not only homopolymerization of ethylene but also copolymerization of ethylene with less than about 10 mole % of another α-olefin such as propylene, butene-1, hexene-1, 4-methyl-pentene-1 and the like or a conjugated diolefin such as butadiene.

A small amount of another α-olefin or a conjugated diolefin can be fed in the first step and/or the second step to control the finally resulting polymer to the density desired.

The hydropolysiloxane used in the preparation of the reaction product (A) is a chain or cyclic hydrosiloxane containing units of the formula $$R_a^1 H_b SiO_{\frac{4-a-b}{2}} \qquad (I)$$

wherein, $R^1$ is a monovalent organic group selected from the group consisting of alkyl, aryl, alkalkyl, aloxy and aryloxy group; a is 0, 1 or 2; b is 1, 2 or 3 and a+b≦3, which is a compound having a suitable polymerization degree or mixture thereof. The polymer can range from a low viscosity liquid of low polymerization degree to a grease or wax of high polymerization degree having a viscosity of 100,000 c.s. at 25° C. and to a solid material.

The terminal groups of the hydroxypolysiloxane do not highly affect the activity and can be any inert group such as trialkyl or trialkylsilyl substituent.

Suitable hydropolysiloxanes include tetramethyldisiloxane, diphenyldisiloxane, trimethylcyclotrisiloxane, tetramethylcyclotetrasiloxane, methylhydropolysiloxane, phenylhydropolysiloxane, ethoxyhydropolysiloxane, cyclooctylhydropolysiloxane and chlorophenylhydropolysiloxane.

The other silicon compounds used for preparing the reaction product (A) used in the process of the present invention are compounds of a structure in which an organic group and hydroxy group are to bonded Si atom a and which have the formula $$R^2_n Si(OH)_{4-n} \qquad (II)$$

wherein $R^2$ represents a $C_1$-$C_{18}$ monovalent hydrocarbon moiety, n is 1, 2 or 3; and $R^2$ can be the same or different when n is 2 or 3; and suitable polysiloxane compounds also include condensates of the silane compound.

In the formula (II), $R^2$ can be alkyl, cycloalkyl, aralkyl, aryl and alkylaryl groups which can be straight chained, branched chained, saturated, unsaturated or cyclic.

Suitable silane compounds having the formula (II) include trimethylhydroxysilane, triethylhydroxysilane, triphenylhydroxysilane, methyldiphenylhydroxysilane and benzylidphenylhydroxysilane (n=3) diethyldihydroxysilane, dipropyldihydroxysilane, diallyldihydroxysilane, dicyclohexyldihydroxysilane and diphenyldihydroxysilane (n=2); and butyltrihydroxysilane and phenyltrihydroxysilane (n=1).

Suitable condensates of the silane compound having the formula (II) include straight chain, branched chain or net-structure type condensates of a siloxane containing groups of the structure Si—O—Si. The polymerization degree is not critical and can be polysiloxane having low polymerization degree and a viscosity of several c.s. at 25° C. and grease or wax having a viscosity of 1,000,000 c.s. and solid polysiloxane.

The polysiloxane can be any type of compound having one or more hydroxyl groups per molecule as shown in formula (II). However, polysiloxanes having a small number of hydroxyl groups are not suitable in practical use. The content of hydroxyl groups in the polysiloxane is more than 0.1 wt.%.

Suitable polysiloxane compounds used in the present invention include α,ω-dihydroxydimethylpolysiloxanes having the formula:

HO[Si(CH$_3$)$_2$O]$_n$H   (n is 2 or more)

and α,ω-dihydroxymethylphenyl polysiloxanes having the formula:

HO[Si(CH$_3$)(C$_6$H$_5$)O] $_n$H(n is 2 or more)

The organic magnesium compounds used for the reaction with the specific organic silicon compound can be various organic magnesium compounds.

Suitable compounds have the formula $$(MgR^3{}_2)_p \cdot (R^3 MgX)_q \qquad (III)$$

($R^3$ is a hydrocarbon moiety; X is a halogen atom; p and q are respectively 0 to 1 and p+q=1) and also include ether complexes thereof as well as mixtures thereof which are obtained by reacting a halogen-containing organic compound with magnesium metal.

Suitable Grignard reagents include $R^3MgX$ (p=0 and q=1) typical Grignard reagent; dihydrocarbyl magnesium having the formula:

$R^3{}_2Mg$ (p=1; q=0)

and other magnesium halides having the formula:

$$(Mg^3{}_2)_p \cdot (R^3 MgX)_q$$

and ether complexes thereof and mixtures thereof.

The organic magnesium compounds can be produced by known processes for example, in an ether type solvent such as diethyl ether, dibutyl ether, tetrahydrofuran, or a hydrocarbon solvent such as heptane, octane, benzene and toluene in the presence of suitable amount of a chelating agent such as an ether or amine.

The process for reacting an organic silicon compound with an organic magnesium compound can be as follows.

The Grignard reagent prepared in suitable solvent is gradually added to the organic silicon compound with stirring in an inert atmosphere.

After the addition the mixture is stirred until the reaction is complete. The organic silicon compound can be used without diluting it. However, it is sometimes preferably diluted with a hydrocarbon solvent. The reaction can be carried out at −50° C. to 100° C., preferably at a temperature higher than room temperature. The reaction time is usually in a range of 30 minutes to 5 hours.

The reaction media can be inert hydrocarbon solvents such as aliphatic and aromatic hydrocarbons. Suitable reaction media include hexane, heptane, cyclohexane, benzene, toluene and xylene. Ether solvents used for the preparation of the Grignard reagent can also be used.

The ratio of the organic silicon compound to the organic magnesium compound charged can be selected within the range of OH:MgR$^3$ of 1:0.05 to 1 as the molar ratio of hydroxyl group in the organic compound to the magnesium-hydrocarbon compound and it is Si:MgR$^3$ of 1:0.05 to 1 as the molar ratio of the hydropolysiloxane to the magnesium-hydrocarbon compound.

The organoaluminum compounds used in the present invention are compounds having the formula $$Al(OR^4)_N X_{3-n}$$

wherein $R^4$ represents a $C_1$-$C_{12}$ alkyl group, $0 < n \leq 3$ and X represents a halogen atom.

Suitable organoaluminum compound include aluminum trimethoxide, aluminum triethoxide, aluminum tri-n-propoxide, aluminum tri-isopropoxide, aluminum mono-sec-butoxydiisopropoxide, aluminum tri-t-butoxide, aluminum monoethxydichloride, aluminum diethoxymonochloride, aluminum monoisopropoxydichloride, and aluminum diisopropoxymonochloride.

These compounds can be obtained by reacting a corresponding alcohol with an organoaluminum compound having the formula $$AlR^4{}_m Y_{3-m}$$

wherein $R^4$ represents a $C_1$-$C_{12}$ alkyl group; $0 < m \leq 3$; Y represents a halogen atom, hydrogen atom, and an alkoxy group.

It is also possible to obtain these compounds by reacting a compound having the formula $Al(OR^4)_3$ with a compound having the formula $AlX_3$ at a suitable molar ratio.

The reaction product of the organoaluminum compound having the formula (IV) with water can be obtained by dissolving or suspending the organoaluminum compound(IV) in an inert hydrocarbon medium and reacting water with it.

The molar ratio of water to the organoaluminum compound (IV) is usually in a range of 0.1 to 3, preferably 0.1 to 2.5

The reaction temperature is usually in the range of 10° to 200° C. The reaction time is usually in the range of 5 min. to 10 hours. The titanium halides used for preparing the solid catalytic components (B) in the present invention are the compounds having the formula $$TiX_n(OR^5)_{4-n}$$

wherein X represents a halogen atom; $R^5$ represents a $C_1$-$C_8$ hydrocarbon moiety, and n is 1 to 4.

Suitable titanium halides include $TiCl_4$, $TiBr_4$, Ti-$(OC_2H_5)Cl_3$, $Ti(OC_4H_9)Cl_3$, $Ti(OC_2H_5)_2Cl_2$, Ti-$(OC_3H_7)_2Cl_2$ and $Ti(OC_4H_9)_2Cl_2$.

The vanadium halides used for preparing the solid catalytic compounds (B) in the present invention can be $VCl_4$ and $VOCl_3$.

The reaction of the reaction product (A) with the titanium halide or the vanadium halide should be carried out under the special condition in order to obtain a polymer having uniform particle size and high bulk density.

The reaction is preferably carried out in an inert solvent especially aromatic or haloaromatic solvents such as benzene, toluene, and chlorobenzene.

After the reaction, the solid phase is separated and washed with an inert hydrocarbon medium such as hexane, heptane and kerosene, to remove transition metal halides and to recover the solid catalytic component (B).

The content of the transition metal component in the solid catalytic component (B) obtained by such process, can be controlled by selecting the reaction condition such as temperature, time and medium, for the reaction of the reaction product (A) with the transition metal halide.

The transition metal content is preferably in a range of 1 to 120 mg per 1 g of the solid catalytic component (B).

The catalyst system comprising the solid catalytic component (B) having said range of the transition metal content, has high catalytic activity.

The reaction of the reaction product (A) with the titanium halide or the vanadium halide in the presence of the aluminum compound (IV) or the reaction product of the organoaluminum compound with water has been studied.

The catalyst system has characteristics for forming a polymer having broader molecular weight distribution in comparison with the catalyst system prepared by reacting in the absence of the organoaluminum compound.

In one example of the reaction, the organoaluminum compound (IV) or the reaction product of the organoaluminum compound with water and the reaction product (A) are mixed with an inert hydrocarbon medium at $-10°$ to 150° C. for 5 min. to 10 hours and then, the titanium halide or the vanadium halide is added to react them at $-50°$ to 200° C.

The ratio of the components are as follows.

The organoaluminum compound (IV) or the reaction product of the organoaluminum compound with water is in a range of 0.1 to 10 mole per 1 g-atom of Mg in the reaction product (A).

The amount of the titanium halide or the vanadium halide is in a range of 1 to 30 moles per 1 g-atom of a total of Mg in the reaction product (A) and Al in the organoaluminum compound or the reaction product of the organoaluminum compound with water.

The content of Ti or V in the solid catalytic component (B) is preferably in a range of 20 to 250 mg per 1 g of the solid catalytic component (B).

The organo-aluminum compound (C) used for the preparation of the polymerization catalyst in the present invention is a compound used for preparing the Ziegler type catalyst.

The typical compounds include organo-metallic compounds having the formula $$AlR^6{}_n X_{3-n}$$

wherein $R^6$ is a $C_1$-$C_8$ hydrocarbon moiety; X is a halogen or hydrogen atom or an alkoxy group; and n is 1, 2 or 3.

Suitable organoaluminum compounds include trimethylaluminum, triethylaluminum, tributylaluminum, diethylaluminum chloride, dibutylaluminum chloride, ethylaluminum sesquichloride, diethylaluminum hydride, dibutylaluminum hydride and diethylaluminum ethoxide. One or more organoaluminum compounds can be used.

Suitable organozinc compounds include diethylzinc and dibutyl zinc.

The catalyst system for the polymerization of ethylene in the present invention can be prepared by contacting the solid catalytic compound (B) with the organoaluminum compound (C) in the presence or absence of an inert solvent. For example, both components are charged in a vessel for the preparation of a catalyst or in a reactor for polymerization in the presence of the medium and they are stirred to easily prepare the catalyst system.

The ratio of these components for the preparation of the catalyst system is in a range of 1 to 1000 g-atom of Al and/or Zn per 1 g-atom of Ti and/or V in the catalyst.

The catalyst system is used in the ratio as follows.

In the first step of the polymerization, the amount of the solid catalyst component (B) is in the range of 0.001-1 g per 1 liter of the medium or 1 liter of the capacity of the reactor, and the amount of the organoaluminum compound (C) is in the range of 0.1-50 m mole especially 0.2-5 m mole per 1 liter of the medium or 1 liter of the capacity of the reactor.

In accordance with the process of the present invention, the molecular weight distribution of the polyethylene can be controlled as desired and a polyethylene having a broad molecular weight distribution can be obtained.

The resulting polyethylene is suitable for preparing extrusion molded products such as films, hollow molded products such as bottles for detergents and containers for industrial chemicals.

In extrusion molding, stable molded products of excellent appearance and strength can be obtained even at high extrusion velocity.

The catalyst system used in the present invention has very high activity and yields polyethylene products in high yield. The catalyst removing step can be simplified or eliminated, without any adverse effect imparted to the properties of the polyethylene by the presence of residual catalyst. The resulting polyethylene has excellent hue.

The present invention will be further illustrated by certain examples and references which are provided for purposes of illustration only and are not intended to be limiting the present invention.

Each resulting polyethylene was admixed with a stabilizer and granulated by an extruder. The physical properties thereof were measured. The measurements are as follows.

MI$_2$: stated above
FR: stated above
Bulk density: JIS-K6721-1966
Density: ASTM-D-1505

In the examples, the pressures are gauge pressures.

EXAMPLE 1

(a) Preparation of Reaction Product (A)

In a glass reactor dried and purged with nitrogen, 75 ml of a solution of n-butylmagnesium chloride in tetrahydrofuran (0.167 mole of n-butylmagnesium chloride) was sampled and 10.5 ml of methylhydropolysiloxane having terminal trimethylsilyl groups (viscosity of about 30 c.s. at 25° C.) (0.175 mole as Si) was gradually added dropwise. Because of exothermic reaction, the reactor was cooled with a coolant. After the addition, the reactor was kept at 70° C. for 1 hour, and then, it was cooled to room temperature to obtain a dark brown transparent solution. In order to remove excess tetrahydrofuran, the solution was diluted with 100 ml of toluene, and then, 120 ml of a mixture of tetrahydrofuran and toluene was distilled off from the solution under a pressure of 160 to 170 mmHg. Then, 120 ml of toluene was added to the residue and 120 ml of a mixture of tetrahydrofuran and toluene was distilled off in the same manner. The resulting solution was diluted with toluene to obtain 334 ml of a toluene solution having a content of Mg of 0.5 mole/liter.

(b) Preparation of solid catalytic component (B)

20 ml (0.182 mole) of titanium tetrachloride cooled at 0° C. was added dropwise to 200 ml of a toluene solution of the reaction product (A) obtained in the step (a) (0.1 mole as Mg) so as to maintain lower than 2° C. After the addition, the reaction was carried out at 0° C. for 2 hours.

The reaction product was admixed with 800 ml of n-hexane. The soluble components were separated by a decantation and a filtration. The operation was repeated for 5 times to obtain 1 liter of n-hexane slurry containing a solid catalytic component (B) of 18.5 g/liter.

The solid catalytic component (B) contained 88 mg of Ti component per 1 g.

(c) Two step polymerization of ethylene

In 1 m$^3$ autoclave equipped with a stirrer, purged with nitrogen, 600 liter of n-hexane, 480 m mole of triethylaluminum and 2.5 g of the solid catalytic component (B) were sequentially charged. The temperature in the autoclave was heated to 85° C. and then, a polymerization was continued by feeding ethylene and hydrogen for 3.5 hours to maintain a molar ratio of 1:1.4 of ethylene:hydrogen in the gaseous phase and a pressure of about 6 kg/cm$^2$. The total feeding of ethylene reached 60 kg. The temperature was decreased to 60° C. and ethylene and hydrogen were purged.

The temperature was elevated to 80° C. and a polymerization was started again and continued for 4 hours by feeding ethylene and hydrogen to maintain a molar ratio of 1:0.10 of ethylene:hydrogen in the gaseous phase and a pressure of about 3 kg/cm$^2$. The temperature was decreased to 60° C. and a polymer slurry was treated by a centrifugal separator to separate the polymer from the solvent. The polymer was dried to obtain 116 kg of a white powdery polyethylene having a bulk density of 0.410, MI$_2$ of 0.28, FR of 17.1 and a density of 0.9609. A polymer productivity of the catalyst was 46.4 kg PE/g cat. and 527 kgPE/g Ti. (kg PE/g cat. means an yield of polyethylene per 1 g of solid catalytic component; kg PE/g Ti means an yield of polyethylene per 1 g of Ti.

The resulting polyethylene was extruded from a hollow molding machine having a diameter of 55 mm at a cylinder temperature of 170° to 190° C. and a die temperature of 180° C. in a molding cycle of 70 sec./piece to mold drums. The appearance of the molded product had smooth texture and was excellent.

REFERENCE 1

(a) One step polymerization of ethylene

In accordance with the process of Example 1, except varying a polymerization temperature of 80° C. and a molar ratio of ethylene:hydrogen of 1:0.34, the polymerization of ethylene was carried out in the same condition with that of the first step. The resulting polyethylene had MI$_2$ of 0.33 and FR of 10.2. In comparison with the results of Example 1, FR was smaller and a molecular weight distribution was remarkably narrow.

In accordance with the process of Example 1 except using the resulting polyethylene, a fabrication of drums by the molding was carried out. Severe shark skin was caused on an inner and outer surfaces of the drum (especially inner surface). The drum could not be practically used as a commercial product.

EXAMPLE 2

(c) Two step polymerization of ethylene

In accordance with the process of Example 1, 550 liters of n-hexane, 400 m mole of triethylaluminum, and 10 g of the solid catalytic component (B) used in Example 1 were sequentially charged.

The autoclave was heated to 85° C. and a polymerization was carried out for 4 hours under maintaining a molar ratio of ethylene to hydrogen of 1:3.6 and a pressure of 6 to 7 kg/cm$^2$. The yield of the polyethylene was 86 kg.

In accordance with the process of Example 1, the autoclave was cooled and was purged with nitrogen gas after releasing the pressure. The autoclave was heated again to 85° C. A polymerization of ethylene was carried out by feeding ethylene and hydrogen and charging 80 m moles of triethylaluminum and 50 liter of n-hexane for 1 hour. The polymerization was carried out for 3 hours under the condition of a molar ratio of ethylene:hydrogen of 1:0.004 and a pressure of about 2.5 kg/cm$^2$.

The yield of a total polyethylene was 146 kg. The polyethylene had a bulk density of 0.364; MI$_2$ of 0.058; FR of 36.5; and a density of 0.9627.

The resulting polyethylene obtained by the formula was extruded by a 50 mm film molding machine. This is fabricated at 200° to 210° C. and at a flow ratio of 3 and an average thickness of the obtained film was 10μ.

A dart impact strength ASTM-D-1709 (A method) of the film was 13.2 kg-cm.

A strength of the film fabricated by molding polyethylene obtained in one step process was 6 to 7 kg. The high strength film having about 2 times of the reference of the film was obtained.

REFERENCE 2

(b) Preparation of Solid Catalytic Component

In a glass reactor equipped with a stirrer and a refluxing condenser, which was purged with dried nitrogen, 21.2 g of the commercially available Mg(OC$_2$H$_5$)$_2$ was charged.

Then, 210 ml of n-heptane and 40 ml of titanium tetrachloride were sequentially added.

The reactor was heated to elevate the temperature in the processing bath. The reaction was carried out for 8 hours under refluxing. After the reaction, the solid catalytic product was washed with n-hexane as the same processes in the method of Example 1 (b).

According to an analysis of the solid catalytic component, the component contained 132 mg of Ti per 1 g of the solid catalytic component.

(c) Two step polymerization of ethylene

In accordance with the process of Example 1 (c), 550 liter of n-hexane, 1 mole of triethylaluminum and 30 g of the solid catalytic component were gradually added.

The mixture was heated at 85° C. and a polymerization of ethylene was carried out by maintaining a molar ratio of ethylene:hydrogen of 1:5.5 under a pressure of 6–7 kg/cm$^2$ for 4 hours. A polyethylene productivity was 43 kg.

In accordance with the process of Example 1, the autoclave was cooled and purged with nitrogen after releasing the pressure.

The autoclave was heated again to 75° C. A polymerization of ethylene was carried out by feeding ethylene and hydrogen and 200 m mole of triethylaluminum with 50 liter of n-hexane for 1 hour. The polymerization was carried out for 2.0 hours under the condition of a molar ratio of ethylene:hydrogen of 1:0.06 and a pressure of about 3 kg/cm$^2$.

A total polyethylene was 78 kg. The polyethylene had a bulk density of 0.256; MI$_2$ of 0.095; FR of 38.2.

The productivity of the catalyst was 2.6 kg PE/g cat. which was remarkably lower than that of Example 2 though MI$_2$ and FR were substantially the same.

The bulk density of the polymer was too low and rough polymer particles having diameter of more than 500μ were about 35% and the characteristic of the powder of the polymer was remarkably inferior.

REFERENCE 3

(b) Preparation of solid catalytic component 2 liter of titanium tetrachloride was admixed with 600 g of commercially available magnesium hydroxide which was dried at 80° C. for 8 hours. The mixture was refluxed to react them for 1.5 hours.

After the reaction, the reaction mixture was post-treated by the process of Example 1 (b) to obtain a solid catalytic component which contained 68.7 mg of Ti component per 1 g.

(c) Two step polymerization of ethylene

In accordance with the process of Reference 2 (c) except using 1.5 mole of triethylaluminum and 300 g of the resulting solid catalytic component and varying a molar ratio of ethylene; hydrogen of 1:14.5, the polymerization in the first step was carried out. The yield of the polyethylene was 28 kg.

After releasing the pressure to discharge ethylene and hydrogen, in accordance with the process of Reference 2 (c), except using 300 m mole of triethylaluminum and varying the molar ratio of ethylene:hydrogen of 1:0.16, the polymerization in the second step was carried our for 3 hours.

The yield of a total of the polymer was 54 kg. The polyethylene had a bulk density of 0.246; MI$_2$ of 0.050; FR of 39.0.

The productivity of the catalyst was 0.18 kg PE/g cat. which was remarkably low. The bulk density of the polymer was too low and particle size of the polymer was remarkably non-uniform.

EXAMPLE 3

(c) Two step polymerization of ethylene and propylene

In accordance with the first step of Example 2 except using 8 g of the solid catalytic component (B) and varying a molar ratio of ethylene:hydrogen of 1:4.5–5.0, a polymerization of ethylene was carried out for 6 hours. The amount of the resulting polyethylene was 70 kg.

In the second step, the reaction mixture was heated to 80° C. and 80 m mole of triethylaluminum and 50 liters of n-hexane were charged under feeding ethylene, hydrogen and propylene.

The polymerization was continued while maintaining a molar ratio of ethylene:hydrogen of 1:0.006 and a molar ratio of ethylene:propylene of 1:0.09 and a pressure of about 2.5 kg/cm$^2$ for 4.5 hours to obtain 142 kg of total polyethylene having a bulk density of 0.372 and MI$_2$ of 0.063 g/10 min., FR of 38.9 and a density of 0.9515.

EXAMPLE 4

(a) Preparation of reaction product (A)

In the apparatus used in Example 1(a), 54 ml of α,ω-dihydroxydimethylpolysiloxane having an average polymerization degree of 9(146 m mole of SiOH content) and 100 ml of toluene were charged. The mixture was stirred at room temperature and 57 ml of n-butyl magnesium chloride (146 m mole) formed in tetrahydrofuran was added dropwise. It was added during 1 hour and then, the mixture was stirred for 1 hour to obtain a turbid solution.

The resulting solution (200 ml, 140 m mole of Mg content) was sampled and was diluted with 400 ml of toluene. Then, it was heated at 80° C. to distill off about a half of the liquid phase. Excess of tetrahydrofuran was removed and the resulting viscous solution was diluted with 300 ml of toluene.

(b) Preparation of solid catalytic component (B)

200 ml of titanium tetrachloride was added dropwise to the solution of the reaction product (A). The reaction was carried out at 70° C. for 1 hour. After the reaction, in accordance with the process of Example 1 (c), the post-treatment was carried out to obtain a slurry of the solid catalytic component (B) in n-hexane. The solid catalytic component (B) contained 452 mg of Ti component per 1 g.

(c) Two step polymerization of ethylene

In accordance with the process of Example 1 (c) except using 8 g of the solid catalytic component (B) and varying a molar ratio of ethylene:hydrogen of 1:3.2, the polymerization of ethylene was carried out in the first step. After 4.5 hours, the amount of polyethylene was 70 kg. The polymerization in the second step was carried out at 70° C. and a molar ratio of ethylene:hydrogen of 1:0.07 under a pressure of 2 kg/cm² for 4 hours to obtain 125 kg of total polyethylene having a bulk density of 0.358 and MI₂ of 0.105, FR of 32.4 and a density of 0.9624.

EXAMPLE 5

(b) Preparation of solid catalytic component (B)

80 ml of the solution of the reaction product (A) in toluene (0.08 mole of Mg content) obtained in Example 1 (a), was added to a solution obtained by dissolving 16.3 g of aluminum triisopropoxide in 100 ml of toluene. The mixture was stirred at 0° C. for 30 minutes and 35 ml of titanium tetrachloride was added dropwise at 0° C. After the addition, the mixture was heated to 95° C. to react them for 2 hours.

In accordance with the process of Example 1 (b), the post-treatment was carried out to obtain a solid catalytic component (B).

According to the analysis, the solid catalytic component (B) contained 160 mg of Ti component per 1 g.

(c) Two step polymerization of ethylene

In a 2.5 l stainless steel autoclave purged with nitrogen, 1.2 liters of n-hexane was charged and then, 1.0 m mole of triisobutylaluminum and 40 mg of the solid catalytic component (B) were added. Hydrogen was fed under a pressure of 5 kg/cm² and the autoclave was heated to 85° C. and ethylene was continuously fed under a total pressure of 9 kg/cm² and the polymerization of ethylene was carried out for 1.5 hours. Then the temperature in the system was cooled to room temperature. Ethylene and hydrogen were discharged and then, hydrogen was fed under a pressure of 1.5 kg/cm². The autoclave was heated to 75° C. and ethylene was continuously fed under a total pressure of 9 kg/cm² and the polymerization of ethylene was carried out for 1.5 hours to obtain 534 g of white powdery polyethylene having a bulk density of 0.351, MI₂ of 0.045 and FR of 32.8. A ratio of polyethylene obtained in the first step to that of the second step was 47:53 by weight.

REFERENCE 4

(c) One step polymerization of ethylene

In accordance with the first step of Example 5 (b), except using 20 mg of the solid catalytic component (B) of Example 5 (b), feeding hydrogen under a pressure of 3 kg/cm² at a polymerization temperature of 80° C., the polymerization of ethylene was carried out for 1 hour to obtain 230 g of polyethylene having a bulk density of 0.302, MI₂ of 0.31 g/10 min. and FR of 15.6.

What is claimed is:

1. In a process for polymerizing ethylene alone or ethylene in admixture with a small amount of another α-olefin or conjugated diolefin in two successive polymerization steps, the improvement comprising:
   polymerizing 30 to 70 wt.% of said ethylene or ethylene mixture in the presence of hydrogen at a molar ratio of ethylene or ethylene mixture to hydrogen of 1:1–8 in the gaseous phase of the polymerization system in the first step and polymerizing the residual amount of said ethylene or ethylene mixture in the second step at an ethylene or ethylene mixture:hydrogen molar ratio of 1:0–0.3 in the gaseous phase of the polymerization system, wherein the catalyst in each of said polymerization steps comprises the combination of (1) an organoaluminum compound (C) selected from the group consisting of organometallic compounds sufficient for preparing Ziegler type catalysts and (2) a specific solid catalyst component (B) obtained by reacting (II) a titanium or vanadium halogen containing compound with a reaction product (A) obtained by reacting (I) a Grignard reagent with a silicon compound selected from the group consisting of a hydropolysiloxane having the formula:

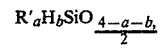

wherein R' is a monovalent alkyl, aryl, aralkyl, alkoxy or aryloxy group, a is 0,1 or 2,b is 1, 2 or 3 and a+b≦3 and a silicon compound including the formula $R_n^2Si(OH)_{4-n}$ wherein $R^2$ represents a $C_1$–$C_{18}$ monovalent hydrocarbon moiety and n is 1, 2 or 3, said reacting (II) being in the presence or absence of an aluminum alkoxide, an aluminum alkoxyhalide or the reaction product obtained by reacting an alkoxyaluminum compound with water.

2. The process according to claim 1 wherein the first polymerization step is conducted at a temperature of 50° to 110° C. under a total pressure of from 1 to 50 kg/cm² in an inert solvent such that a slurry of the polymer product is formed and wherein the second polymerization step is conducted at a temperature from 50° to 110° C. under a total pressure of from 1 to B 50 kg/cm² in an inert solvent.

3. The process according to claim 1, wherein said ethylene mixture contains less than 10 mole % of another olefin selected from the group consisting of propylene, butene-1, hexene-1, and 4-methyl-pentene-1, or a conjugated diene.

4. The process according to claim 1, wherein the silicon compound is a silane having at least one organic group and at least one hydroxyl group of the formula:

$$R_n^2Si(OH)_{4-n} \qquad (II)$$

wherein $R^2$ represents a $C_1$-$C_{18}$ monovalent hydrocarbon moiety, n is 1, 2 or 3 or is a polysiloxane condensate of silane (II).

5. The process according to claim 1, wherein the titanium halogen-containing compound is a compound having the formula $$TiX_n(OR^5)_{4-n}$$

wherein X represents a halogen atom, $R^5$ represents a $C_1$-$C_{18}$ hydrocarbon moiety and n is a value from 1 to 4, and the vanadium halogen-containing compound is a compound having the formula $$VX_n(OR^5)_{4-n}$$

wherein X, $R^5$ and n are as defined above.

6. The process according to claim 1, wherein in the first step of the polymerization reaction, the amount of solid catalyst component (B) is present in the range of 0.001-1 gram per 1 liter of the reaction medium and wherein the amount of the organometallic compound (C) is in the range of 0.1-50 millimole per 1 liter of the reaction medium.

7. The process according to claim 1, wherein the amount of said titanium or vanadium in solid catalyst component (B) is in the range of 1 to 120 mg. per 1 gram of solid catalyst component (B) in the absence of said aluminum alkoxide, said aluminum oxyhalide or said reaction product.

8. The process according to claim 1, wherein said vanadium halogen containing compound is:

$$VCl_4 \text{ or } VOCl_3$$

* * * * *